United States Patent
Fogal, Sr. et al.

[19]

[11] Patent Number: 5,931,204

[45] Date of Patent: Aug. 3, 1999

[54] METHOD AND APPARATUS FOR INTRODUCING A PULVERULENT MATERIAL INTO A TIRE

[76] Inventors: Robert D. Fogal, Sr., 15 Kenwood Rd., Chamberburg, Pa. 17201; Ray G. Buckles, 539 Monceau Dr., St. Louis, Mo. 63135; Warren E. Schuessler, Jr., 12670 Bayshore Dr., Florissant, Mo. 63033

[21] Appl. No.: 08/685,056

[22] Filed: Jul. 23, 1996

Related U.S. Application Data

[63] Continuation-in-part of application No. 08/566,018, Dec. 1, 1995, abandoned, which is a continuation of application No. 08/229,536, Apr. 19, 1994, Pat. No. 5,472,023, and a continuation-in-part of application No. 08/040,289, Mar. 30, 1993, Pat. No. 5,386,857.

[51] Int. Cl.⁶ .................................................. B60C 19/00
[52] U.S. Cl. .................................. 141/38; 141/5; 141/9; 141/2; 141/18; 141/67; 141/83
[58] Field of Search .................................. 141/4, 5, 7, 9, 141/2, 18, 21, 38, 67, 83, 100

[56] References Cited

U.S. PATENT DOCUMENTS

| | | |
|---|---|---|
| 2,525,256 | 10/1950 | Byram ................................. 141/38 X |
| 2,652,181 | 9/1953 | Rupp ................................. 141/38 X |
| 3,200,858 | 8/1965 | Kampert ................................. 141/38 |
| 4,191,223 | 3/1980 | Bourgeois ................................. 141/18 |
| 4,506,708 | 3/1985 | Onuma ................................. 141/4 |
| 4,545,410 | 10/1985 | Paul et al. ................................. 141/18 |
| 4,550,755 | 11/1985 | Vredenburg, Sr. ................................. 141/67 X |
| 4,640,322 | 2/1987 | Ballester ................................. 141/5 |
| 4,763,709 | 8/1988 | Scholer ................................. 141/38 X |
| 4,904,154 | 2/1990 | Campbell et al. ................................. 141/83 X |

*Primary Examiner*—J. Casimer Jacyna
*Attorney, Agent, or Firm*—Oldham & Oldham Co., L.P.A.

[57] ABSTRACT

An apparatus for introducing a pulverulent material into a tire of a wheel assembly, through the valve stem thereof, without a large amount of operator time, effort, or intervention. The apparatus includes two main types of components—the mainframe component and one or more workstation components. Each workstation component serves as a location from which an operator of the apparatus introduces the pulverulent material into a tire and the mainframe component includes the a container for confining a predetermined amount of the pulverulent material and includes the other components required to dispense the pulverulent material into the container from a hopper or the like, and to evacuate the pulverulent material from the container and distribute the same out to a workstation through a suitable conduit where the pulverulent material is introduced into a tire. A method of introducing pulverulent material into a tire is also described.

60 Claims, 6 Drawing Sheets

METHOD AND APPARATUS FOR INTRODUCING A PULVERULENT MATERIAL INTO A TIRE

CROSS REFERENCE TO RELATED APPLICATION

This application is a continuation-in-part of U.S. patent application of Robert D. Fogal et al., Ser. No. 08/566,018 filed Dec. 1, 1995, now abandoned, which application is a continuation of U.S. Pat. No. 5,472,023 issued to Fogal, Sr. et al., filed Dec. 5, 1995 Ser. No. 08/229, 536 filed Apr. 19, 1992 and a continuation-in-part of U.S. Pat. No. 5,386,857 issued to Fogal, Sr., et al., Feb. 7, 1995 Ser. No. 08/040,289 filed Mar. 30, 1993. U.S. patent application 08/566,018, and U.S. Pat. Nos. 5,472,023 and 5,386,857 are expressly incorporated by reference herein.

FIELD OF INVENTION

The present invention relates generally to the field of dynamic wheel assembly balancing utilizing a pulverulent material introduced into a pneumatic tire mounted on a wheel, and more particularly to a method and apparatus for quickly and accurately dispensing a predetermined amount of pulverulent material from a source thereof, and thereafter distributing the pulverulent material to a workstation for introduction into a tire mounted on a wheel or rim.

BACKGROUND OF THE INVENTION

The present invention is directed to the general field of dynamically balancing the wheel assemblies found on automobiles, trucks, airplanes, and other vehicles by introducing a predetermined amount of a pulverulent material, such as a product sold under the trademark EQUAL® by International Marketing, Inc. of Chambersburg, Pa., into a pneumatic tire which is mounted on a wheel or rim of the wheel assembly. As used herein, the terms "wheel assembly" and "tire assembly" each refer to a tire mounted on a wheel or a rim.

The specifics of the method of balancing a wheel assembly (including equalizing radial and lateral force variations) by introducing a pulverulent material into the tire thereof are fully disclosed in U.S. Pat. No. 5,073,217 issued to Robert D. Fogal on Dec. 17, 1991, all of which patent is also expressly incorporated by reference herein. As is described in U.S. Pat. No. 5,472,023, introducing pulverulent material into a tire of a wheel assembly generally involves confining a predetermined amount of pulverulent material; subjecting the confined pulverulent material to pressurized air currents; and, introducing the pulverulent material into a tire through an associated tire valve stem under the force of the pressurized air currents. This prior patent also describes two different applicator devices for performing the above method. While these devices are effective in carrying out these operations, they require the operator thereof to perform a variety of time consuming manual steps. For example, once the operator determines the proper amount of pulverulent material to be utilized within a tire, the operator must manually dispense this predetermined amount (typically in terms of weight) and place the same within the cylinder of the applicator device. The applicator device must then be sealed and connected between the tire valve stem of the wheel assembly and a source of compressed air such as a shop air line. Once the applicator device is properly connected, the operator must manually open one or more valves to allow compressed air to flow into the applicator and an admixture of compressed air and pulverulent material to exit the applicator and travel into the tire through the associated tire valve stem.

In addition to the above steps required of an operator during the application procedure, the operator must also perform a number of preliminary steps to prepare the tire to receive the pulverulent material. If the tire has just been mounted on a wheel or rim, the operator must first "bead" the tire—i.e., compressed air must be introduced into the tire to ensure that the bead of each sidewall is properly seated against its respective rim flange. Once a tire is beaded properly, it must be at least partially deflated so that it will not become overinflated upon the introduction of the compressed air and pulverulent material into the tire. An operator has heretofore been required to bead a newly mounted tire prior to connecting the valve stem of the wheel assembly to the applicator apparatus. Also, the operator has heretofore been required to deflate or "bleed" an already mounted tire in preparation for the application procedure. Only after these steps have been performed, was the operator able to connect the valve stem of the tire to the applicator device. Finally, prior applicator devices typically require the operator to disconnect the tire therefrom in order to complete the application procedure by inflating the tire to its recommended tire pressure.

There has therefore been found a need to provide an applicator apparatus and a method for introducing a pulverulent material into a tire without the above-noted deficiencies of prior applicator devices and methods. Specifically, there has been found a need to provide an applicator apparatus that performs the "beading" operation (if required), performs pre-application partial deflation of the tire (if required), introduces the pulverulent material into a tire, and performs the final re-inflation procedure. There has also been found a need to provide an apparatus that quickly and efficiently dispenses a predetermined amount of pulverulent material from a source thereof into a confining space in preparation for its "application" or introduction into a tire.

SUMMARY OF THE INVENTION

In light of the foregoing and other deficiencies associated with prior art application methods and apparatus, the present invention is directed to an apparatus for introducing a pulverulent material into a tire of a wheel assembly, wherein the apparatus includes a container, preferably a hollow cylinder, for confining a predetermined amount of a pulverulent material. The container includes an inlet and is connected through the inlet and a conduit to a source of pulverulent material, such as a hopper, and also includes an air pressure variation orifice connected to a vacuum source such that pulverulent material may be pulled into the container from the hopper or other source in response to a vacuum force created within the container by the vacuum source. The container includes an outlet which is connected to a valve stem of a tire using a suitable conduit. The pressure variation orifice is also connected, in selective fluid communication, to a source of pressurized air such that the pulverulent material is evacuated from the container through the outlet and introduced into the tire in response to pressurized air currents created in the container upon the introduction of compressed air into the container through the pressure variation orifice.

The apparatus of the present invention preferably comprises two main types of components—the mainframe component and one or more workstation components, although the two types of components may be combined into a single component or further subdivided into additional components. Each workstation component serves as a location from which an operator of the apparatus introduces the pulverulent material into a tire. The mainframe component includes the above described container for confining a predetermined amount of the pulverulent material and includes the other components required to dispense the pulverulent material into the container from a hopper or the like, and to evacuate the pulverulent material from the container and distribute the same out to a workstation through a suitable conduit where the pulverulent material is introduced into a tire. The mainframe also includes a keyboard and display for an operator to enter and view data.

Each workstation includes a keypad for the entry of tire and other data, an outlet conduit for connection to a tire valve stem to introduce compressed air or an admixture of compressed air and pulverulent material into a tire, and each workstation also preferably includes an inlet conduit for connection to a source of compressed air. Each workstation also includes a valve for selectively opening the outlet conduit of the workstation to the atmosphere through a compressed air exhaust outlet, thereby allowing compressed air to be expelled from within a tire. It can be seen therefore, that once a tire is connected to the outlet conduit of a workstation, air may be released from the tire, air may be introduced into the tire, and the admixture of compressed air and pulverulent material originating at the mainframe may be introduced into the tire, without disconnecting the tire from the outlet conduit of the workstation, and without a large amount of operator time, effort, or intervention.

DETAILED DESCRIPTION OF THE INVENTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
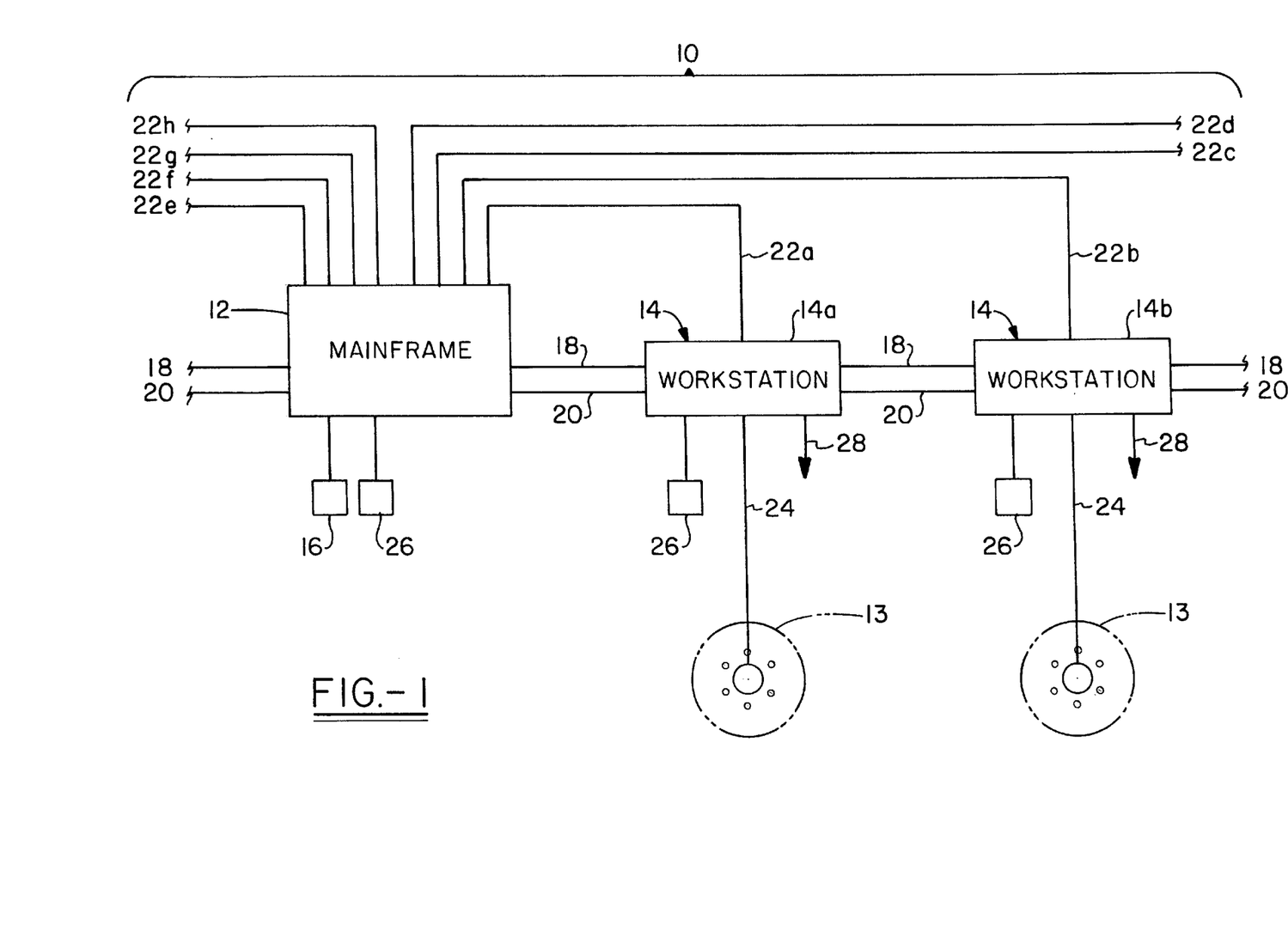
FIG. 1 is a partial schematic view of an apparatus in accordance with the present invention, wherein a mainframe and two workstations are shown.

Referring specifically to FIG. 1, there is partially shown at 10 a schematic view of an apparatus in accordance with the present invention. The apparatus 10 comprises two main types of components, a mainframe type component 12, and a workstation type component generally shown at 14. In general, the apparatus 10 will include a single mainframe component 12 and one or more workstation components 14. While only two workstations 14a,14b are shown in FIG. 1, any number may be provided. FIG. 1 describes a preferred embodiment of the present invention 10, wherein connections are provided for up to eight workstations 14a–14h as is described in further detail below.

The mainframe component 12 dispenses a predetermined amount of a suitable pulverulent material from a source thereof into a container, and thereafter causes the pulverulent material to travel to the appropriate workstation 14 for introduction into a tire 13 (shown in phantom). Each workstation 14 is in selective fluid communication with the mainframe 12 through the use of a suitable distribution conduit such as pneumatic tubing 22a–22h, and once a workstation 14 is ready to receive the pulverulent material from the mainframe 12, the mainframe 12 dispenses the pulverulent material, and causes the same to travel through the appropriate tubing 22a–h to the requesting workstation 14 for introduction into a tire 13. The tire 13 is connected in fluid communication to a workstation 14 through a suitable outlet conduit such as pneumatic tubing 24. Tubing 24 preferably includes an air chuck type pneumatic fitting on a terminal end thereof such that tubing 24 can be connected in fluid communication to the tire valve stem of a tire 13 (the valve core is ordinarily removed from the tire valve stem to facilitate the movement of the pulverulent material therethrough). In this manner, a predetermined amount of pulverulent material originating at mainframe 12 can travel from the mainframe 12 through tubing 22 to a workstation 14, and through tubing 24 into a tire 13 through an associated tire valve stem. It is thought preferable, as is shown herein, to provide a distinct length of tubing 22 from mainframe 12 to each workstation 14, although other arrangements may be utilized.

The mainframe component 12 and the one or more workstation components 14 are preferably separate from one another, however, those skilled in the art will recognize that one or more workstations 14 may be combined with the mainframe 12 to form an apparatus 10 combining both the mainframe and workstation operations as are discussed in detail below. Again, as shown in FIG. 1, the apparatus 10 comprises two workstations 14a,14b, and those skilled in the art will certainly recognize that more or less workstations 14 may be provided and form a part of the apparatus 10, and the invention 10 is not meant to be limited to the particular arrangement shown herein.

The mainframe 12 is connected to and receives electrical power from an electrical power source such as a 115 Volt A.C. (VAC) supply 16 as is commonly found in the United States of America, or any other suitable electrical power source. Each work station 14 is also connected to an electrical power source, and preferably, groups of workstations 14 extending from mainframe 12 are connected through electrical wires 18 to receive electrical power, such as 115 VAC, from the mainframe 12, and if applicable, through an adjacent workstation 14. Alternatively, of course, each workstation 14 may be directly connected to a source of electrical power.

As is discussed in further detail below, the mainframe 12 and each workstation 14 are connected to a common data "bus" such as an RS-485 connection or bus 20 as is well known in the art of electronics such that each workstation 14 can exchange data with the mainframe 12. As shown herein, the apparatus 10 has an overall linear configuration, with a centrally located mainframe 12 and workstations 14 extending from opposite sides thereof, with connections 18,20 for electrical power and data transmission, respectively. Of course, the apparatus 10 may be provided in other configurations with alternative connections for power and data transmission.

Mainframe 12 and each workstation 14 are also connected to a source of compressed air 26. As is discussed below, mainframe 12 preferably uses compressed air (in conjunction with a venturi) to create a vacuum force for dispensing a predetermined amount of pulverulent material from a source thereof, and mainframe 12 also uses compressed air to force the thus measured pulverulent material out to the appropriate workstation 14, through tubing 22a–22h, and into a tire 13. Each workstation 14 is preferably independently connected to a source of compressed air 26 such that an operator of a workstation 14 can cause compressed air to be communicated into a tire 13 through tubing 24 in order to inflate or "bead" a tire. Alternatively, all workstations 14 and mainframe 12 may be connected to a common source of compressed air for inflation procedures. Also, each workstation 14 may include an exhaust outlet 28 through which compressed air is exhausted or "bled" from a tire 13 by entering workstation 14 through tubing 24, and exiting workstation 14 into the atmosphere through exhaust outlet 28. As is discussed below, bleeding air from tire 13 in this manner allows the bleeding operation to be automatically controlled. Of course, alternative systems exist for bleeding a tire, and for example, the tire 13 may be manually bled by the operator depressing the valve core pin (or removing the valve core altogether) and periodically checking the air pressure of the tire 13.

Figure 2:
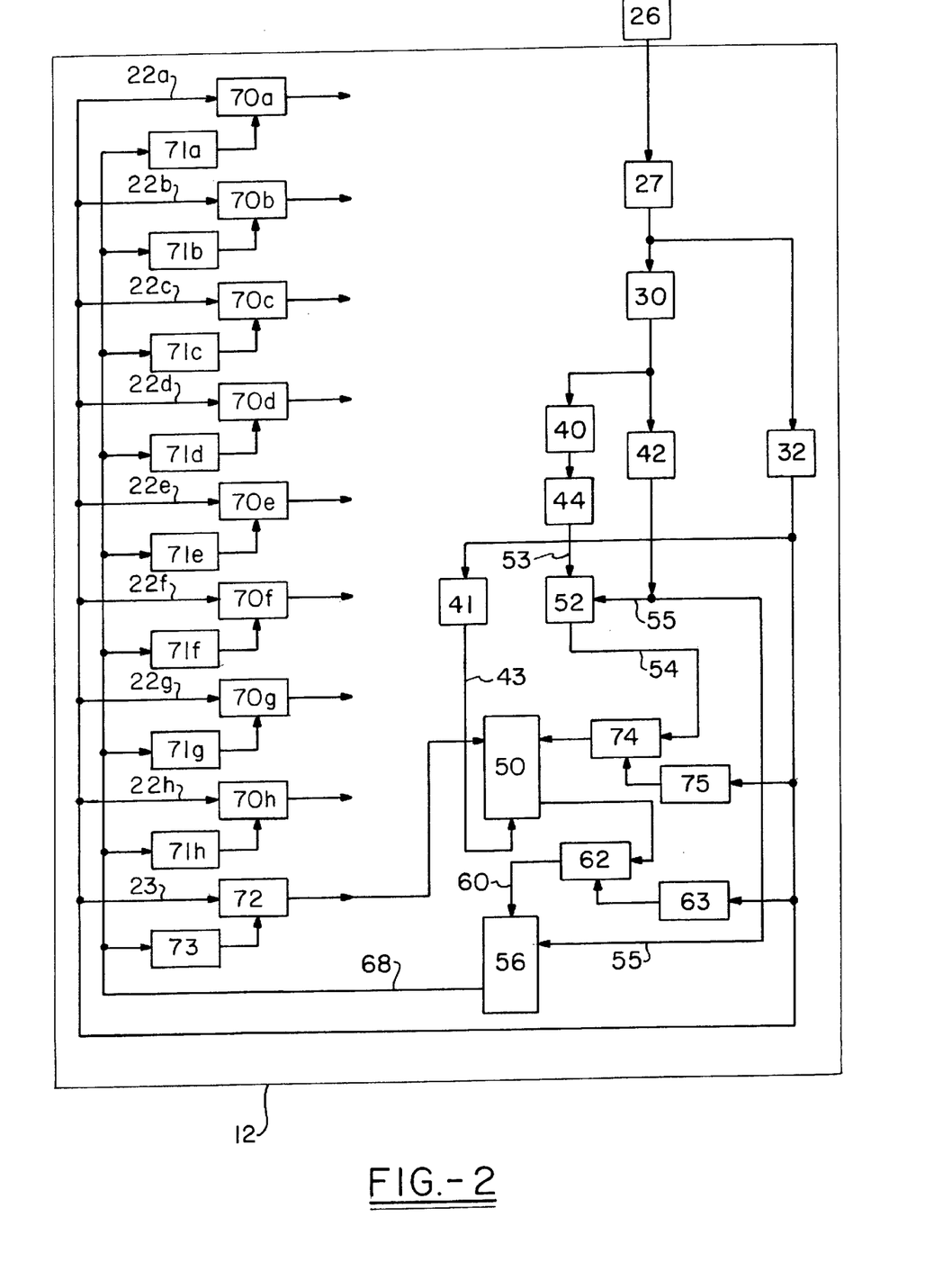
FIG. 2 is a schematic view showing the pneumatics of a mainframe component in accordance with the present invention.

Referring now to FIG. 2 wherein the pneumatics of the mainframe component 12 are shown schematically, it can be seen that mainframe 12 is in fluid communication with a source of compressed air 26 through the use of suitable pneumatic tubing as is well known in the art of pneumatics. Preferably, source of compressed air 26 has an air pressure no greater than 165 pounds per square inch gauge (p.s.i.g.). Compressed air source 26 is in fluid communication with an air filter 27 for filtering moisture, dirt, and other contaminants from the compressed air. Compressed air from source 26 is communicated from filter 27 to two different air pressure regulators 30,32. The preferred embodiment of the invention 10 utilizes a first air pressure to perform the dispensing and distribution of the pulverulent material, and utilizes a second air pressure to control the operation of a plurality of pinch valves. Pinch valves are known in the art of pneumatics, and generally utilize a pressure variation of 20–30 p.s.i.g. to control open and closing operations of the valve. Therefore, air pressure regulator 30 provides an output air pressure used for dispensing and distribution of pulverulent material, for example, 80 p.s.i.g. and air pressure regulator 32 provides an output air pressure of 20–30 p.s.i.g. greater than the output of regulator 30, for example 105 p.s.i.g. and the output air pressure from regulator 32 is used primarily to close the various pinch valves (discussed more fully below) by providing a positive pressure variation over the 80 p.s.i.g. air pressure used for dispensing and distributing the pulverulent material.

Figures 6, 7:
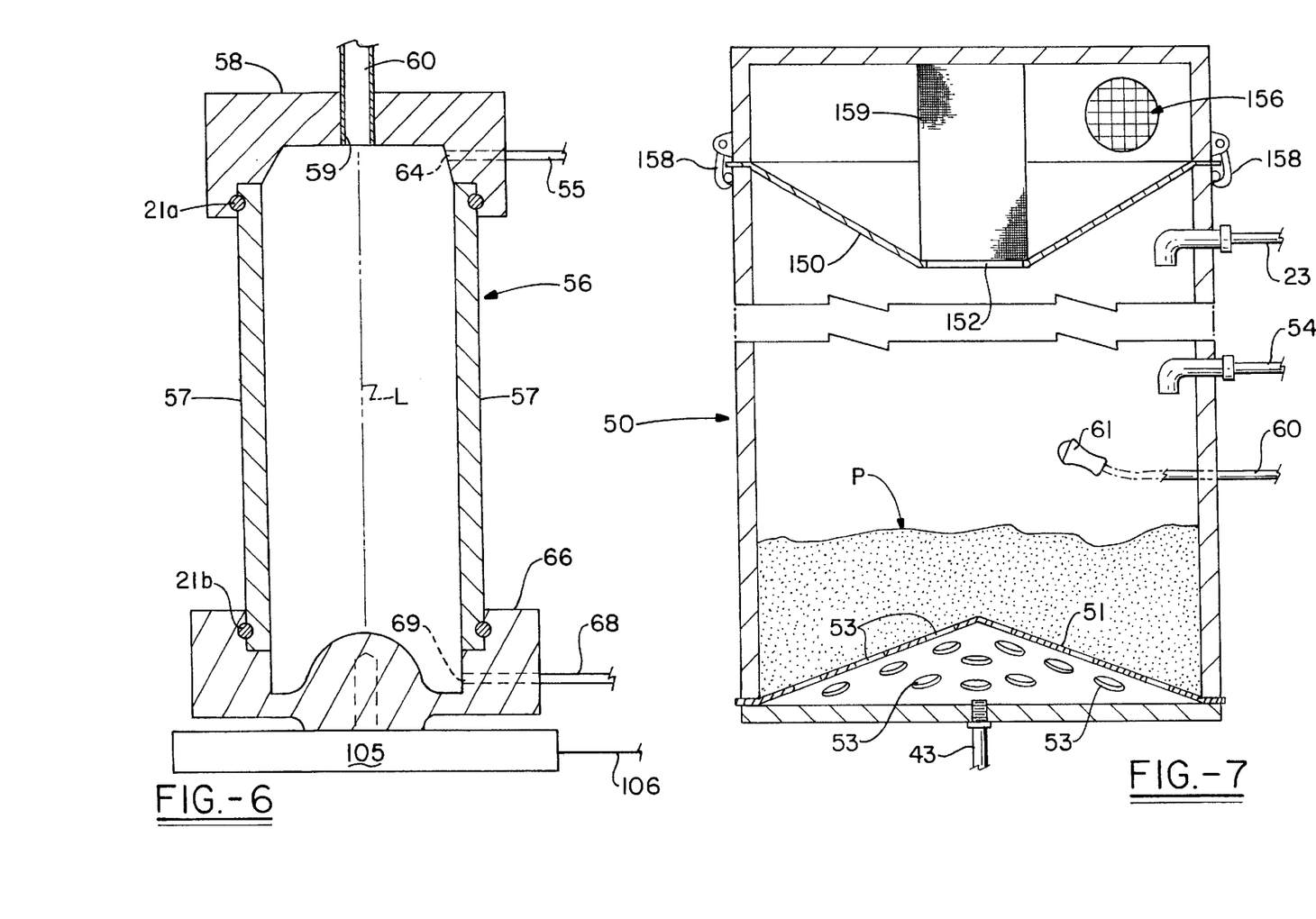
FIG. 6 is a cross-sectional view showing a container in accordance with the present invention.
FIG. 7 is a cross-sectional view of a hopper for storing a quantity of pulverulent material in accordance with the present invention; and, FIGS. 8A and 8B are partial elevational views of two preferred arrangement of the purge and distribution pinch valves of the present invention.

Referring now to the output from air pressure regulator 30, a first solenoid valve 40 is provided in fluid communication therewith. Solenoid valves are well known in the art and are used to selectively block and unblock fluid communication through a conduit (such as pneumatic tubing) with which the solenoid valve is in fluid communication. Outlet of first solenoid 40 is in fluid communication with a venturi 52 which is preferably a single-stage venturi which generates a vacuum of approximately in the range of 20 inches of mercury or more. A check valve 44 may be provided between venturi 52 and solenoid 40 if desired. Venturi 52 includes an inlet port in fluid communication with pneumatic tubing 53, an outlet or exhaust port in fluid communication with pneumatic tubing 54, and a vacuum port in fluid communication with pneumatic tubing 55. Those skilled in the art will recognize that the flow of compressed air from pneumatic tubing 53 into venturi 52 and out of venturi into pneumatic tubing 54 will create a vacuum force pulling air into venturi 52 through pneumatic tubing 55. As is explained below, this vacuum force is utilized to create a relatively low pressure condition or "vacuum" condition in a container 56, relative to ambient air pressure, such that pulverulent material P is withdrawn or suctioned from hopper 50 through fitting 61 (FIG. 7) and tubing 60 into container 56. In the preferred embodiment, container is a generally hollow cylinder 56 as is shown in FIG. 6. Tubing 55 is therefore connected between vacuum port of venturi 52 and cylinder 56 such that a relatively low pressure area or vacuum may be created in cylinder 56 as desired. Those skilled in the art will certainly recognize that venturi 52 is only one of a wide variety of vacuum generators that may be utilized to create a vacuum force in cylinder 56, and the invention is not meant to be limited to the particular vacuum generator shown herein. Additionally, although it has been found preferable to utilize a vacuum force to withdraw the pulverulent material P from the hopper 50, it should be recognized that the pressure differential causes the pulverulent material P to be dispensed from hopper 50 into cylinder 56, and therefore, positive air pressure may alternatively be used.

Output from air pressure regulator 32 is in selective fluid communication with a lower portion of a pulverulent material storage hopper 50 through a pilot valve 41 (discussed more fully below). Hopper 50 (see also FIG. 7) contains a quantity (such as 5–7 gallons) of pulverulent material P therein. The flow of compressed air from regulator 32 through pilot valve 41 is preferably directed through conduit 43 into the lower portion of hopper 50, through a diffuser 51. Diffuser 51 is preferably conical or otherwise non-planar and includes holes 53 covered with a mesh or screen material (not shown) which is provided to prevent the pulverulent material P from falling downward through holes 53 into the area below diffuser 51. As is described fully below, the compressed air from conduit 43 causes the pulverulent material P to be dispersed in a cloud or admixture throughout hopper 50 such that the pulverulent material P can be suctioned from hopper 50 through fitting 61 into tubing 60 without forming voids and caves during its evacuation from hopper 50. Hopper 50 is initially filled with a quantity of pulverulent material P by pouring the pulverulent material P through funnel-shaped insert 150 having an orifice 152 formed therethrough. When the apparatus 10 is in operation, a cover member is secured in position over the hopper 50 as shown with the use of latches 158 or the like. Cover includes an exhaust vent 156 and a filter 159 is positioned over orifice 152 to prevent the pulverulent material from escaping hopper 50 when air is exhausted through orifice 152. Although the pulverulent material P is preferably dispensed from hopper 50 with the use of a vacuum force, compressed air is also directed into hopper 50 to stir the pulverulent material P, and therefore, orifice 152, filter 159 and cover vent 156 must be provided.

Referring to FIGS. 2 and 6, and specifically the cylinder 56, it can be seen that the cylinder comprises a wall portion 57 capped at its ends by upper and lower bulkheads 58,66, respectively. O-ring seals 21a,21b are provided between wall 57 and bulkheads 58,66 to facilitate the formation of an air-tight seal therebetween. Bulkhead 58 includes a pulverulent material inlet 59 formed therethrough and in fluid communication with a suitable conduit such as tubing 60. Inlet 59 has a diameter in the range of ½" is in selective fluid communication with pulverulent material hopper 50 through tubing 60 and pinch valve 62. Although not required, inlet 59 may be provided coaxial with the longitudinal axis L of cylinder 56 as shown. As is discussed above and in further detail below, pinch valve 62 selectively blocks the communication of pulverulent material from hopper 50 into cylinder 56 through tubing 60. It can be seen most clearly in FIG. 6 that upper bulkhead 58 of cylinder 56 also includes at least one pressure variation port 64 formed therethrough and in fluid communication with tubing 55 such that a vacuum or relatively low pressure relative to ambient pressure can be generated in cylinder 56 through pressure variation port 64 in response to the vacuum force created by venturi 52. (To evacuate pulverulent material from cylinder 56 as is explained below, a high pressure, relative to the air pressure within a tire, is established in cylinder 56 through the introduction of compressed air into cylinder 56 through pressure variation orifice 64). Pressure variation port is substantially smaller in diameter than inlet 59.

Figure 8A:
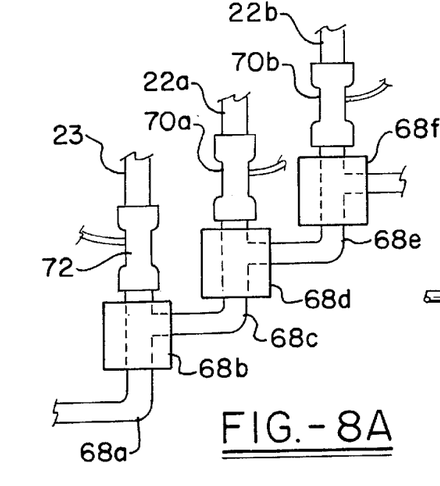

Lower bulkhead 66 of cylinder 56 includes a pulverulent material outlet port 69 formed therein having a diameter in the range of ⅛". The axis of outlet port 69 preferably intersects the wall 57 of cylinder 56 at an oblique angle such that the evacuation of pulverulent material from cylinder 56 is facilitated. Specifically, during the evacuation of cylinder 56, the pulverulent material and compressed air form a swirling admixture within cylinder, and the location of the outlet port 69 as described has been found to result in a more complete evacuation of cylinder 56 through a suitable outlet conduit such as tubing or pipe 68. Conduit 68, which may be a combination of pneumatic tubing lengths and pneumatic fittings as shown in FIG. 8A, for example, is in selective fluid communication with each workstation 14 through tubing 22a–h and a network of distribution pinch valves 70a–70h, respectively, such that pulverulent material can be distributed to any one of the workstations 14 as required and is discussed below. In addition to being connected to each of the workstations 14, conduit 68 is in selective fluid communication with hopper 50 through pinch valve 72 and purge tubing 23 such that if the incorrect amount of pulverulent material is dispensed into cylinder 56, it may simply be evacuated therefrom as is discussed in further detail below, and directed through purge tubing 23 back into hopper 50. Conduit 68 is preferably metallic or made of another suitable wear resistant conduit material along at least a portion thereof extending from cylinder 56, to resist wear caused by the pulverulent material traveling therethrough at a high rate of speed as occurs upon evacuation of pulverulent material from cylinder 56.

Figure 8B:
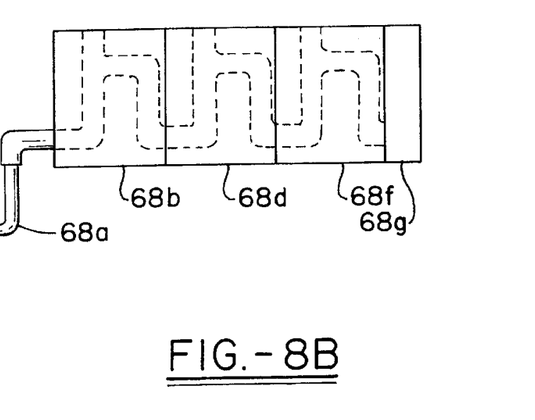

The arrangement of purge pinch valve 72 and distribution pinch valves 70a–70h shown in FIG. 8A has been found to be an effective arrangement for ensuring that the pulverulent material contained within conduit 68 is directed to the proper workstation 14. It can be seen that the pinch valves 72, 70a–70h are arranged in a stair-step fashion with conduit 68 provided by a combination of pneumatic tubing 68a and other pneumatic fittings 68b–68f. Conduit 68 is ultimately terminated by a plug or a closed fitting. The arrangement of pinch valves 72,70a–70h as shown makes it less likely or impossible for pulverulent material traveling through conduit 68 to substantially "overshoot" its destination purge conduit 23 or distribution conduit 22a–22h (the destination conduit being the one conduit 23,22a–22h with an open pinch valve 72,70a–h, respectively), as would occur if conduit 68 were simply linear. FIG. 8B shows another preferred arrangement for conduit 68 (without showing the associated pinch valves 62, 70a–70h, 72, 74) wherein pneumatic fittings 68b, 68d, 68f are modularly connected in fluid communication and wherein conduit 68 is terminated by an end cap 68g.

Referring again to FIGS. 2 and 7, the outlet or exhaust of venturi 52 is connected to tubing 54 which is in selective fluid communication with hopper 50 through a pinch valve 74. In this manner, when pinch valve 74 is open, as it will be when venturi 52 is utilized to create a vacuum force, the exhaust flow from venturi 52 is directed into hopper 50 and acts to further stir the pulverulent material P stored therein to facilitate the easy removal of pulverulent material P from hopper 50. The outlet of air pressure regulator 30 is also in fluid communication with tubing 55 (and consequently pressure variation orifice 64 of cylinder 56) through a second solenoid valve 42. Second solenoid valve 42 is provided to allow selective direct fluid communication between outlet of air pressure regulator 30 and pressure variation orifice 64 of cylinder 56 as is required during the positive pressure evacuation of pulverulent material from cylinder 56.

As described herein, the apparatus 10, and specifically the mainframe component 12 includes a plurality of pinch valves 62,70a–70h,72,74 for selectively blocking and unblocking fluid communication through the lengths of pneumatic tubing 60,22a–22h,23,54, respectively. Pinch valves are well known in the pneumatic arts and are particularly well suited for selectively blocking and unblocking the flow of a slurry such as an admixture of pulverulent material and compressed air. In general, a pinch valve is a bladder-type valve which is normally open to allow a flow therethrough at a first pressure. However, when a second pressure is applied to the bladder that is 20–30 pounds per square inch (p.s.i.) greater than the first pressure at which the flow is occurring through the valve, the bladder closes to prevent any further flow through the valve. In the present case, as discussed above, an air pressure regulator 32 is provided and has an output air pressure that is approximately 25 p.s.i. greater than the output of air pressure regulator 30. The output of air pressure regulator 30 is used to dispense the pulverulent material into the cylinder 56 and to distribute the pulverulent material to each workstation 14 and into a tire 13. The output of air pressure regulator 32 is used only to close the various pinch valves 62,70a–70h,72,74.

Each pinch valve 62,70a–70h,72,74 is respectively connected to the output of air pressure regulator 32 through a pilot valve 63,71a–71h,73,75. As described herein, pilot valves 63,71a–71h,73,75 are electrically controlled and when open, allow fluid communication between output of second air pressure regulator 32 and their respective pinch valves 62,70a–70h,72,74 to cause the closing of the pinch valves 62,70a–70h,72,74 under the force of the air pressure originating at output of second air pressure regulator 32. For example, pilot valves 63,71a–71h,73,75 may be 0.08 CV airflow with ⁵⁄₃₂" quick-connect ports. As mentioned above in relation to FIG. 2, a similar pilot valve 41 is also provided to selectively allow fluid communication between second pressure regulator 32 and lower portion of hopper 50.

Figure 3:
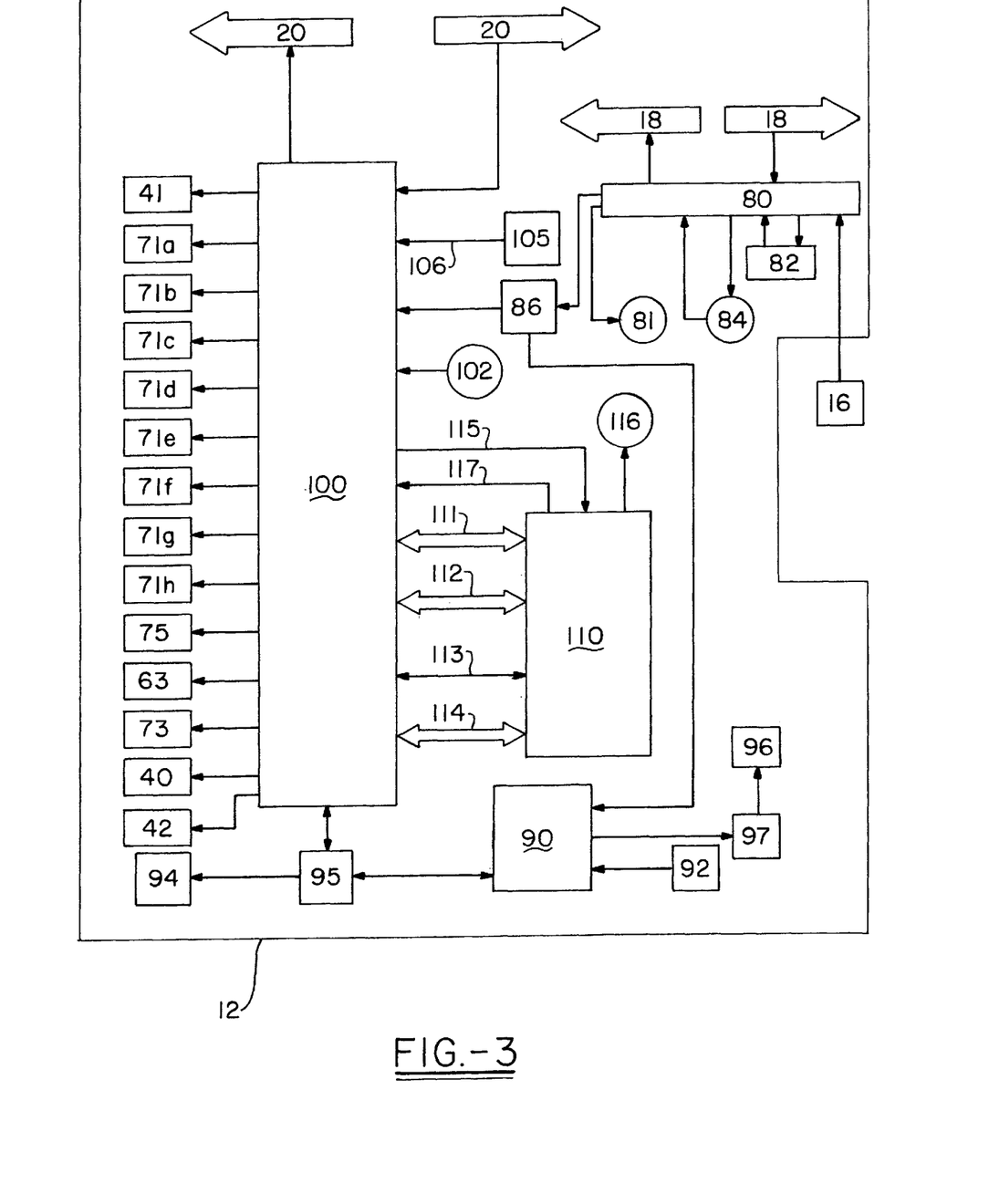
FIG. 3 is a schematic view showing the electronics and electrical system of a mainframe component in accordance with the present invention.

FIG. 3 schematically shows the electrical and electronics systems of the mainframe component 12. As discussed in relation to FIG. 1, mainframe 12 receives electrical power through an electrical connection to a power source 16 such as a 115 VAC as is typically found in the United States of America or by a connection to any other suitable power source. Power source 16 is preferably connected to a 115 VAC terminal block 80 to facilitate power distribution to the various components discussed herein. A power surge suppressor 82 is provided to prevent voltage surges from damaging the electrical system of the apparatus 10. A circuit breaker 84 is also provided to prevent excessive electrical current from flowing through the electrical system of the apparatus 10. Terminal block 80 includes outputs 18, discussed above in relation to FIG. 1, for providing electrical power to the workstations 14 of apparatus 10. Terminal block 80 is connected to a direct current (DC) power supply 86 having dual output voltages of 5 volts and 12 volts to control the mainframe electronics discussed herein and solenoid valves 40,42, respectively. Alternatively, separate power supplies may be provided for the solenoids 40,42 and the electronics to prevent power surges to the electronics by operation of solenoid valves 40,42. A chassis cooling fan 81 is also provided and receives power from terminal block 80.

Power supply 86, includes a first output connected to a computer system motherboard such as a PC system motherboard 90. Motherboard 90 is also connected to a keyboard 92 and a data storage device such as a 3.5" floppy disk drive 94, to receive input data therefrom. Disk drive 94 may be connected to motherboard 90 and controlled by a PC system IDE controller card 95 as is well known in the art of electronics and computers. PC motherboard 90 is also connected to a display monitor 96 for displaying output data to an operator of the apparatus 10. Monitor 96 may be a CRT display monitor or an LCD monitor and is connected to the PC motherboard 90 through the appropriate interface video card 97 as is well known. PC motherboard 90 and the electronic devices associated therewith may be utilized to record information about the operation of the apparatus 10, including the number and types of tires treated, the amount of pulverulent material dispensed, and other information relating to the machine operations.

Figure 5:
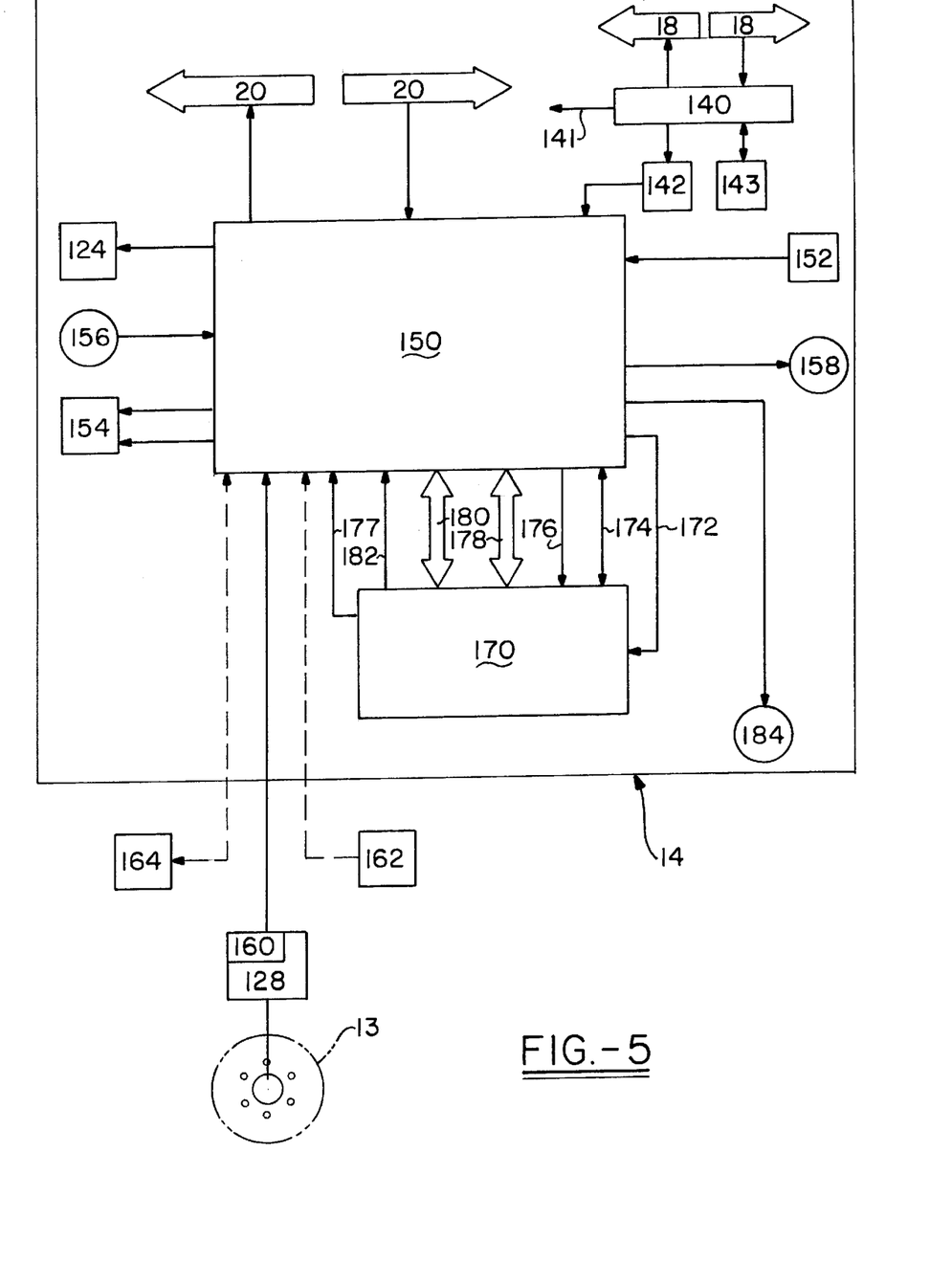
FIG. 5 is a schematic view showing the electronics and electrical system of a workstation component in accordance with the present invention.

Output of power supply 86 is also connected to a peripheral driver board 100 which functions as an input/output device for the solenoid valves 40,42, pilot valves 41, 63,71a–71h,73,75, and the RS-485 bus 20 (discussed above in relation to FIG. 1) such that each workstation 14 can exchange data with the mainframe 12. Peripheral driver board 100 also includes an emergency stop switch 102 connected thereto such that an operator of the apparatus 10, and specifically the mainframe component 12 thereof, can shut down the operations of the apparatus by pressing the emergency stop switch 102. The dispensing and distribution of the pulverulent material is controlled by a microcontroller 110, such as a Motorola 68HC11 microcontroller, and each workstation 14 also includes the same or a similar microcontroller 170 (FIG. 5). Microcontroller 110 therefore includes a plurality of connections with peripheral driver board 100 such as a parallel data connection 111, an expansion bus connection 112, a serial data connection 113, and a digital input/output connection 114, a 5 volt D.C. power connection 115, and a reset control connection 117. Microcontroller 110 is also connected to the PC system IDE controller card 95 such that controller 110 can request and receive data from disk drive 94. Mainframe 12 also includes a reset switch 116, which is preferably key operated for security purposes, used to reset the electronics of the mainframe 12.

Cylinder 56 into which the pulverulent material is dispensed is supported on a weigh scale or other weight sensor such as load cell 105 which is connected to peripheral driver board 100 through electrical connection 106 (see also FIG. 6). Load cell 105 utilizes a strain gauge to accurately measure the weight of pulverulent material in the cylinder 56, although other weight measuring devices may be utilized to determine the weight of pulverulent material within the cylinder 56. Load cell 105 is connected to peripheral driver board 100 through connection 106 (FIG. 3), and is consequently connected to microcontroller 110 such that the weight of pulverulent material in the cylinder 56 can be continually monitored to ensure that the correct predetermined amount of material is dispensed from hopper 50. Upon the load cell 105 sensing the predetermined amount of pulverulent material in the cylinder 56, the flow of pulverulent material from the hopper 50 into the cylinder is stopped by microcontroller 110 as is described below.

Figure 4:
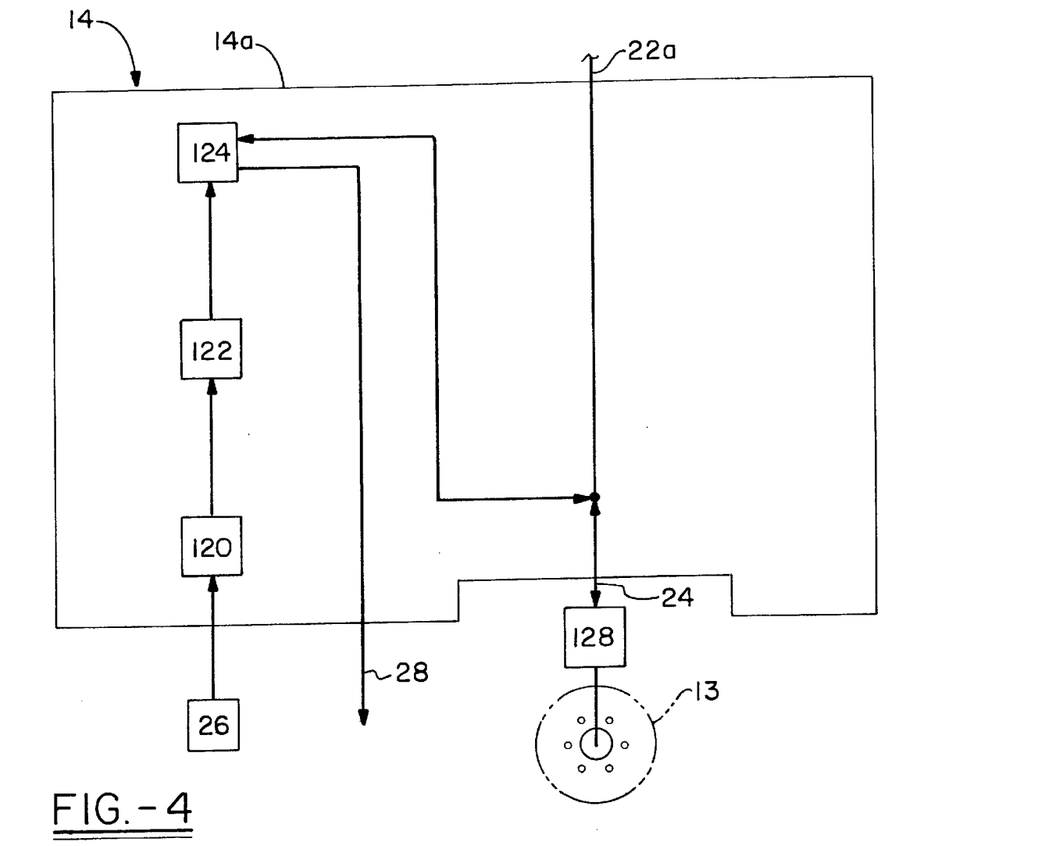
FIG. 4 is a schematic view showing the pneumatics of a workstation component in accordance with the present invention.

Referring now to FIG. 4, the pneumatics of a workstation component 14 in accordance with the present invention 10 are shown. For simplicity, the pneumatics of workstation 14a are shown, although those skilled in the art will recognize that the pneumatics of the other workstations 14 are in accordance with those of workstation 14a. As discussed in relation to FIG. 1, workstation 14a is in fluid communication with an external source of compressed air 26 which preferably has a maximum air pressure of 165 p.s.i.g. Compressed air from source 26 is connected to workstation 14a through an in-line moisture filter 120 used to remove moisture and other contaminants from the compressed air. Outlet of filter 120 is coupled to a pressure regulator 122 which is configured to provide an output air pressure in the range of 80–110 p.s.i.g. and most preferably 80 p.s.i.g. Pneumatic tubing 24 connects outlet of pressure regulator 122 and an air chuck 128 through a workstation solenoid valve 124, which is a three position valve which may be closed, open to a first position for fluid communication between conduits 24,28, or open to a second position for fluid communication between air supply 26 and conduit 24. An air chuck is a pneumatic fitting for mating in fluid communication with a tire valve stem of a pneumatic tire as is well known in the art of pneumatic tires. Air chuck 128 is coupled to a tire valve stem (not shown) of tire 13 and consequently is in fluid communication with the interior of the pneumatic tire 13. In its second open position, solenoid valve 124 allows selective communication of compressed air from outlet of air pressure regulator 122 to air chuck 128 as is well known in the art. When solenoid valve 124 is open to its second position, a tire 13 may be beaded, as discussed above, or may be fully inflated to operating air pressure through pneumatic tubing 24 and air chuck 128. As was noted above in relation to FIG. 1, each workstation 14 may also be utilized to deflate or partially deflate a tire 13. FIG. 4 shows that tire 13 is in selective fluid communication with compressed air exhaust outlet 28 through a workstation solenoid valve 124, and a tire may be deflated or partially deflated by opening solenoid 124 to its first open position which allows fluid communication between conduits 24,28.

It can also be seen that pneumatic tubing 24, air chuck 128, and tire 13 are in fluid communication with one of pneumatic tubes 22a–h (22a in the example shown) originating at mainframe 12 for carrying an admixture of pulverulent material and compressed air to the workstation 14. When a particular workstation 14 has requested that the pulverulent material be dispensed and distributed thereto, the mainframe 12 causes the pulverulent material to be distributed to the workstation 14 through its respective pneumatic delivery tubing 22a–h. With respect to workstation 14a shown, those skilled in the art will recognize (and it is further explained below) that the admixture of pulverulent material and compressed air can travel through pneumatic tubing 22a, into pneumatic tubing 24, and directly into tire 13 through air chuck 128 and the valve stem of the tire 13.

FIG. 5 schematically shows the electrical and electronic systems of each workstation 14. As noted above, each workstation 14 is connected to a common electrical power bus 18 so as to receive electrical power, such as 115 VAC therefrom. Also, each workstation 14, along with the mainframe 12, is connected to a common data bus 20 such as the previously described RS-485 bus, to send data to and receive data from the mainframe 12. The common electrical power bus is connected to a 115 VAC terminal block 140 which is preferably electrically grounded at 141. Terminal block 140, which preferably includes a circuit breaker 143, provides 115 VAC input to a DC power supply 142 having 12 VDC output to provide electrical power to the first and second workstation solenoid valves 124,130 and having a 5 VDC output to provide electrical power for the other workstation electronics as discussed herein. As with mainframe 12, two separate power supplies may be utilized for the electronics and solenoid valves 124,130 to prevent power surges. Outputs from power supply 142 are connected to workstation peripheral driver board 150 which functions as an input/output device for the various components of each workstation 14, including a workstation keypad or keyboard 152 for data entry, a workstation display such as an LCD 154 for data viewing by an operator of the workstation 14, the first and second workstation solenoid valves 124,130, an emergency stop switch 156 for shutting down machine operations in the event of an emergency, and a beeper 158 used to provide audio information to an operator of the workstation 14. The peripheral driver board 150 is also preferably connected to a tire air pressure sensor 160 which is a part of air chuck 128 connected to tire valve stem of a tire 13. Sensor 160 sends data regarding the air pressure contained within a tire 13 to peripheral driver board 150. As is shown in phantom, peripheral driver board 150 may also be connected to a runout sensor 162 (which may be a mechanical sensor, an optical sensor, or any other suitable runout sensor) for sensing the radial and/or lateral runout of a tire 13 to provide the apparatus 10, and an operator thereof, additional information regarding the condition of a tire 13 that is to be loaded with the pulverulent material. Also, as is shown in phantom at 164, the peripheral driver board 150 may be selectively connected to an electronic analysis instrument, such as a laptop computer 164, through a connection such as an RS-232 serial port, for a service technician to monitor the performance of each workstation 14 and the mainframe 12.

While the input/output to the above described components is carried out through the peripheral driver board 150, the control of these various functions is provided by a microcontroller 170 such as a Motorola 68HC11 microcontroller or another similar computer chip. The microcontroller 170 receives electrical power through a connection 172 from peripheral driver board 150, exchanges serial data with peripheral driver board 150 through an RS-232 connection 174, receives analog data from peripheral driver board 150 through connection 176, exchanges digital input/output data with peripheral driver board through connection 178, and exchanges serial data with peripheral driver board 150 through an RS-485 connection 182. A reset connection 177 and an expansion bus connection 180 are also provided. Workstation 14 also includes a reset switch 184, which is preferably of the key activated type for security purposes, connected to board 150 to reset workstation 14 as may be required. Each workstation 14 also includes a unique computer "address", which may be varied through the use of jumpers or the like. In this manner, communication between each workstation 14 and the mainframe 12 is capable along a common data bus 20 as described. For example, the address information allows the mainframe to determine which workstation 14 is requesting pulverulent material, and which workstation 14 is sending any other data to the mainframe 12. Also, the unique address allows the mainframe 12 to communicate data to a particular workstation 14 by including that workstation's address as a part of the data.

The above described apparatus 10, can carry out a variety of operations including, beading a tire 13, deflating a tire 13 to a predetermined air pressure, inflating a tire 13 to a predetermined air pressure, introducing a pulverulent material into a tire 13, and others. The operator of a workstation 14 may depress different keys and combinations thereof on workstation keyboard 152 to select a particular machine operation. The particular keys used to select each operation may vary, although the workstation display 154 will ordinarily prompt a workstation operator to press one or more keys depending upon the operation desired. For example, the video display 154 of a workstation 14 may present the operator with three main choices: 1) Perform a Tire Runout Test; 2) Bead/Inflate a Tire; and 3) Load a Tire (by introducing pulverulent material into the tire). The operations may be carried out, for example, as follows:

Runout Test

To perform a tire runout test, an operator of a workstation 14 positions a runout sensor 162 adjacent to a tire 13 (or in contact therewith, depending upon the type of sensor). The operator depresses the appropriate key(s) on workstation keyboard 152 to begin the testing procedure. The operator then rotates the tire 13 (which may be rotatably mounted on an elevated vehicle or a tire changing machine). The runout sensor 162 will communicate data to the workstation peripheral driver board 150 regarding the radial and/or lateral runout of the tire 13 and the same information may be displayed on workstation display 154 for viewing by an operator.

Beading a Tire

To bead a tire 13 at a workstation 14 (the workstation 14 may be combined with a tire changing apparatus), or to inflate a tire 13 to its operating pressure, an air chuck 128, preferably including an air pressure sensor 160, is connected to the tire valve stem of the tire 13. The operator presses the appropriate key(s) on workstation keyboard 152 as indicated on workstation display 154 to select the beading operation. The workstation display 154 prompts the operator to enter a predetermined tire pressure desired for the beading or filling operation (usually the maximum allowed pressure for the tire). Once the operator enters this information, the tire 13 will begin to fill with compressed air.

Specifically, the workstation microcontroller 170 informs the mainframe controller 110 that a tire 13 is about to be inflated at the workstation 14. This information and the information discussed below, including the address of the workstation 14, is sent from the workstation 14 to the mainframe 12 over the data bus 20. The workstation controller 170 then causes its respective distribution pinch valve 70a–70h (corresponding to workstations 14a, 14b) or additional workstations to close. Closing the appropriate distribution pinch valve 70a–70h is important to prevent compressed air from the workstation 14 from traveling back to the mainframe 12 and disrupting other operations that might be occurring with respect to other workstations 14. Closing the distribution pinch valve 71a–71h of each workstation 14 effectively isolates the pneumatics of the workstation 14 from the pneumatics of the mainframe 12.

The workstation controller 170 next causes the workstation solenoid valve 124 (FIG. 5) to open to its second position, thereby allowing fluid communication of compressed air from source 26 to the tire 13. The workstation controller 170 monitors the air pressure within the tire 13 using data received from air pressure sensor 160. When the air pressure within the tire 13 reaches the predetermined value previously input by the machine operator, the workstation controller 170 causes workstation solenoid valve 124 to close, thereby blocking further communication of compressed air from source 26 into tire 13. The operator may then disconnect the air chuck 128 from the tire valve stem of the tire 13. The workstation controller 170 then notifies the mainframe 12 (again by transmitting data over the data bus 20) that the beading/inflation operation is complete.

Introducing Pulverulent Material into a Tire

Once a newly mounted tire 13 has been beaded the operator of the apparatus 10 may choose to introduce a predetermined amount of pulverulent material into the tire 13. This operation may also be performed on a tire 13 that has not been recently mounted, but instead has been in use. It is ordinarily preferable to remove the valve core from within the valve stem to facilitate the introduction of the pulverulent material into the tire 13. The air chuck 128, including the tire air pressure sensor 160, is connected to the tire valve stem of the tire 13 (or is already connected due to a just completed beading operation). The operator may then depress the appropriate key(s) on workstation keyboard 152 to select the loading/balancing procedure as indicated on workstation display 154. In response to the operator's entered request, the tire 13 will first be deflated or "bled" to some fraction of its ordinary or maximum operating air pressure. It is thought preferable to bleed a tire 13 down to 15%–30% of its maximum rated operating pressure. The workstation controller 170 calculates this value based upon the maximum rated tire pressure keyed in by the operator of the apparatus 10. Of course, the tire may be manually bled if desired.

In order to partially deflate the tire 13, the workstation controller 170 closes workstation solenoid valve 124 and causes its respective distribution pinch valve 70a–70h in mainframe 12 to be closed by applying the appropriate signal on common data bus 20 to pneumatically isolate the workstation 14 from the mainframe 12 as described (these valves will be caused to close automatically by the workstation controller 170 upon the connection of the air chuck 128 to an inflated tire 13 as sensed by air pressure sensor 160). The workstation 14 then informs the mainframe 12, through the data bus 20, that a tire 13 is being deflated. The workstation controller 170 then causes workstation solenoid valve 124 to open to its first position, allowing fluid communication from tire 13 to compressed air exhaust outlet 28. The workstation controller 170 continues to monitor the air pressure within the tire 13 during the deflation process through data received from air pressure sensor 160 of air chuck 128. When tire 13 has been deflated to 30% (or some other predetermined fraction) of its rated tire pressure, the workstation controller 170 causes workstation solenoid valve 124 to close, thereby preventing any further communication of compressed air from tire 13 to compressed air exhaust outlet 28. The workstation controller 170 then notifies the mainframe 12 through the data bus 20 that the tire 13 is ready to receive an application of the pulverulent material. In the example shown, only one workstation 14 may be serviced by mainframe 12 at any one time. If a workstation 14 is being serviced when the mainframe receives another workstation request, the additional request is put onto a stack or into a queue or is otherwise put on hold. Also, those skilled in the art will recognize that mainframe 12 may be provided with more than one cylinder 56 and the other components discussed above such that multiple tires may be loaded with pulverulent material at any one time.

As is best seen in FIGS. 2 and 3, when the mainframe controller 110 is prepared to dispense the pulverulent material from hopper 50, it closes the workstation distribution pinch valves 70a–70h and the purge valve 72. As discussed previously, this is accomplished by energizing the pilot valves 71a–71h, and 73, thereby allowing the relatively higher pressure air from second air pressure regulator 32 to close the pinch valves 71a–71h, and 72. The mainframe controller 110 opens pinch valves 62,74 and closes both mainframe solenoid valves 40,42.

The mainframe controller takes a reference "zero" reading of weight of cylinder 56 on load cell 105. This reference value is used to determine the amount of pulverulent material that is dispensed into the cylinder 56. The mainframe controller 110 then opens solenoid valve 40 to venturi 52, creating a vacuum force in cylinder 56 as described and causing the pulverulent material from hopper 50 to enter cylinder 56 through pneumatic fitting 61, tubing 60 and input orifice 59. During this time, the mainframe controller 110 continuously monitors the output data from load cell 105 to calculate the increasing weight of pulverulent material in the cylinder 56. Also, as is described above, upon the opening of solenoid valve 40, pilot valve 41 is also opened such that compressed air from regulator 32 is directed through conduit 43 into hopper 50 in the area below diffuser 51 to create an admixture or "cloud" of pulverulent material P and compressed air within hopper 50. Additionally, the exhaust air flow from venturi 52 is directed through conduit 54 and pinch valve 74 into hopper 50 to further "stir" the admixture while the pulverulent material P is withdrawn through fitting 61. Those skilled in the art will recognize that the excess air pressure within hopper 50 will be vented through orifice 152 and vent 156, with filter 159 preventing the exit of pulverulent material P. When the cylinder 56 contains the predetermined weight of pulverulent material, the mainframe controller 110 first closes pinch valve 62 to allow tubing 60 between pinch valve 62 and cylinder 56 to be emptied. After a brief delay, the mainframe controller closes solenoid valve 40, pilot valve 41, and finally pinch valve 74.

With a predetermined amount of pulverulent material contained within the cylinder 56, the mainframe controller 110 closes all workstation distribution pinch valves 70a–70h, purging pinch valve 72, venturi exhaust pinch valve 74, and vacuum line pinch valve 62. The mainframe controller 110 also causes the first and second mainframe solenoid valves 40,42 to close. The mainframe controller 110 communicates the completion of the above to the workstation controller 170. The workstation controller 170 then causes the workstation solenoid valves 124,130 to close, and gives control of its workstation distribution pinch valves 70a–70h to the mainframe controller 110. The mainframe controller 110 then opens the proper one of distribution pinch valves 70a–70h corresponding the workstation 14 where the pulverulent material is to be distributed. The mainframe controller 110 next opens solenoid valve 42 to allow direct fluid communication between first air pressure regulator 30 and cylinder 56 through pneumatic tubing 55 and pressure variation orifice 64 of cylinder 56. The opening of solenoid valve 42 causes a high pressure condition within cylinder 56, relative to the air pressure within tire 13, which also causes the pulverulent material therein to form a swirling or turbulent admixture with the compressed air and exit cylinder 56 through exit orifice 69 formed through lower bulkhead 66 of cylinder 56 and travel into conduit 68. The admixture of pulverulent material and compressed air in conduit 68 will naturally travel to the distribution conduit 22*a*–22*h* having an open distribution pinch valve 70*a*–70*h*. As is shown in FIGS. 8A and 8B, the connections between conduit 68 and the various workstation distribution conduits 22*a*–22*h*, may be staggered in a stair-step or similar fashion to facilitate the flow of the pulverulent material into the distribution tubing 22*a*–22*f* having the open pinch valve 70*a*–70*f*. As is shown most clearly in FIG. 4, the distribution tube 22*a* connects with interior of tire 13 through tubing 24 and air chuck 128, allowing the admixture of pulverulent material and compressed air to enter tire 13 through the valve stem thereof. Mainframe check valve 44 (FIG. 2) prevents migration of pulverulent material from tubing 55, venturi 52, or tubing 53 into solenoid valve 40 when solenoid valve 42 is opened.

The mainframe controller 110 continually receives data from the load cell 105 through its connection 106 with mainframe peripheral driver board 100 to thereby monitor the amount of pulverulent material in the cylinder 56 during the evacuation thereof. When the mainframe controller 110 determines that at least substantially all of the pulverulent material has been evacuated from the cylinder 56, it delays for a short period of time, such as 1–2 seconds, to ensure that all of the pulverulent material has entered the tire 13. The mainframe controller 110 then closes the one previously opened workstation distribution pinch valve 70*a*–70*h* and the mainframe solenoid valve 42. The mainframe controller 110 then informs the workstation controller 170 (by sending out the appropriate signal on data bus 20) that it has completed the distribution of pulverulent material to that workstation 14. The workstation controller 170 once again seizes control of its respective distribution pinch valve 70*a*–70*h*, ensuring that it closes (and remains closed). The mainframe controller 110 opens the venturi exhaust pinch valve 74 to relieve any pressure in the cylinder 56, and after a slight delay of 1–2 seconds, the mainframe controller 110 then opens all distribution pinch valves 70*a*–70*h* (except those forced closed by a workstation 14), the vacuum line pinch valve 62, and the purge line pinch valve 72.

A purging operation is identical to the above-described distribution operation, except that the purge line pinch valve 72, rather than one of the workstation distribution pinch valves 70*a*–70*h* is opened, causing the pulverulent material evacuated from the cylinder 56 to be routed back into the hopper 50. This is required, for example, if it is necessary to abort a dispensing or distribution operation for any reason. For example, if an incorrect amount of pulverulent material is vacuumed into the cylinder 56, the pulverulent material may simply be evacuated therefrom into the hopper 50 through purge line 23. If the dispensing/distribution operation takes longer than a predetermined amount of time (indicating an error) the purge function will occur to evacuate the cylinder 56.

Those skilled in the art will recognize that the foregoing description has set forth the preferred embodiment of the invention in particular detail and it must be understood that numerous modifications, substitutions and changes can be undertaken without departing from the true spirit and scope of the present invention as defined by the ensuing claims.

What is claimed is:

1. An apparatus for introducing pulverulent material into a tire, said apparatus comprising:

a container for receiving and confining an amount of pulverulent material, said container including a pulverulent material inlet in selective fluid communication with a source of pulverulent material, a pulverulent material outlet in selective communication with at least one tire, and at least one pressure variation orifice;

a means for measuring a pre-determined amount of said pulverulent material within said container;

whereby pulverulent material is dispensed into said container from said source of pulverulent material when said pressure variation orifice of said container is connected in fluid communication with a vacuum source to thereby establish a low pressure condition, relative to ambient conditions, within said container, and whereby pulverulent material confined within said container is expelled therefrom and introduced into said at least one tire when said at least one pressure variation orifice is connected in fluid communication with a source of compressed air to thereby establish a high pressure condition, relative to ambient conditions within said container.

2. An apparatus as recited in claim 1, wherein said apparatus further comprises a vacuum generator in selective fluid communication with said at least one pressure variation orifice.

3. An apparatus as recited in claim 2, wherein said vacuum generator is a venturi having an inlet port in selective fluid communication with a source of compressed air, an outlet port, and a vacuum port in selective fluid communication with said at least one pressure variation orifice of said container.

4. An apparatus as recited in claim 3, wherein said source of pulverulent material is provided by a hopper, and wherein said outlet port of said venturi is in selective fluid communication with said hopper such that compressed air exhausted from said venturi impinges upon pulverulent material within said hopper.

5. An apparatus as recited in claim 4, wherein a valve is connected between said outlet port of said venturi and said hopper such that said valve blocks fluid communication between said outlet port of said venturi and said hopper.

6. An apparatus as recited in claim 5, wherein said valve is a pneumatically controlled pinch valve.

7. An apparatus as recited in claim 3, wherein said apparatus includes at least one compressed air inlet for connection to a source of compressed air, and wherein said inlet port of said venturi is in selective fluid communication with said at least one compressed air inlet through a solenoid valve.

8. An apparatus as recited in claim 7, wherein a pressure regulator is provided between said inlet port of said venturi and said compressed air inlet of said apparatus.

9. An apparatus as recited in claim 7, wherein a check valve is provided between said solenoid valve and said inlet port of said venturi to prevent the migration of pulverulent material into said solenoid valve from said venturi.

10. An apparatus as recited in claim 7, wherein said apparatus further comprises at least one microcontroller, and wherein said solenoid valve is connected to said at least one microcontroller such that said solenoid valve opens and closes in response to signals received from said microcontroller.

11. An apparatus as recited in claim 2, wherein said at least one pressure variation orifice of said container is also in selective fluid communication with a source of compressed air such that a high pressure condition, relative to ambient conditions, is established within said container when compressed air is communicated into said container through said at least one pressure variation orifice.

12. An apparatus as recited in claim 11, wherein a solenoid valve is connected between said at least one pressure variation orifice and a source of compressed air to selective block fluid communication of compressed air from said source into said container.

13. An apparatus as recited in claim 12, wherein said apparatus further comprises a microcontroller, and wherein said solenoid connected between said at least one pressure variation orifice and said source of compressed air is connected to said at least one microcontroller such that said solenoid opens and closes in response to signals received from said microcontroller.

14. An apparatus as recited in claim 1, wherein said at least one pressure variation orifice is provided by a single pressure variation orifice.

15. An apparatus as recited in claim 1, wherein said container is a cylinder.

16. An apparatus as recited in claim 15, wherein said cylinder includes a first end and a second end, and wherein said inlet port is formed in said first end of said cylinder and said outlet port is formed in said second end of said cylinder.

17. An apparatus as recited in claim 16, wherein said first and second ends of said cylinder are provided respectively by first and second bulkheads, and wherein said pulverulent material inlet port and said at least one pressure variation orifice are formed through said first bulkhead, and said pulverulent material outlet port is formed through said second bulkhead.

18. An apparatus as recited in claim 17, wherein said cylinder has a longitudinal axis and wherein said pulverulent material inlet port is formed coaxial with said longitudinal axis.

19. An apparatus as recited in claim 17, wherein said cylinder is oriented substantially vertically such that said first end is above said second end.

20. An apparatus as recited in claim 1, wherein said pulverulent material outlet port is also in selective fluid communication with said source of pulverulent material, such that pulverulent material confined within said container can be selectively returned to said source thereof.

21. An apparatus as recited in claim 20, wherein a valve is connected between said pulverulent material outlet port of said container and said source of pulverulent material to selective block fluid communication between said container to said source of pulverulent material.

22. An apparatus as recited in claim 21, wherein said valve is a pneumatically controlled pinch valve.

23. An apparatus as recited in claim 1, wherein said source of pulverulent material is provided by a hopper connected to said apparatus.

24. An apparatus as recited in claim 23, wherein said hopper is in selective fluid communication with a source of fluid under positive pressure, such that said fluid is introduced into said hopper while pulverulent material is being dispensed therefrom, to thereby form an admixture of fluid and pulverulent material within said hopper.

25. An apparatus as recited in claim 24, wherein said hopper includes a lower portion and wherein compressed air is directed into said hopper through said lower portion thereof, such that pulverulent material contained in said hopper forms an admixture with said compressed air directed into said lower portion of said hopper to thereby facilitate the distribution of said pulverulent material from said hopper into said container.

26. An apparatus as recited in claim 25, wherein said lower portion of said hopper includes a diffuser therein, said diffuser including a plurality of holes formed therethrough, wherein said holes are in fluid communication with said source of compressed air.

27. An apparatus as recited in claim 26, wherein said diffuser is non-planar.

28. An apparatus as recited in claim 1, further comprising:

a valve connected between said inlet of said container and said source of pulverulent material to selectively block fluid communication between said source and said container;

a valve connected between said pulverulent material outlet of said container and said at least one tire to selectively block fluid communication between said container and said at least one tire.

29. An apparatus as recited in claim 28, wherein said valve connected between said inlet of said container and said source of pulverulent material and said valve connected between said pulverulent material outlet of said container and said at least one tire are pneumatically controlled pinch valves.

30. An apparatus as recited in claim 29, wherein said apparatus further comprises:

at least one microcontroller;

at least one electrically controlled pilot valve connected to each pneumatically controlled pinch valve, said pilot valves selectively blocking fluid communication of compressed air to said pinch valves, such that each of said pilot valves is opened and closed in response to electrical signals received from said at least one microcontroller.

31. An apparatus as recited in claim 1, further comprising:

a microcontroller;

a weight sensor connected to said microcontroller such that said microcontroller receives data from said weight sensor regarding the weight of pulverulent material within said container, such that said microcontroller terminates the flow of pulverulent material into said container when a predetermined amount of pulverulent material is contained within said container.

32. An apparatus as recited in claim 31, wherein said weight sensor is a load cell.

33. An apparatus as recited in claim 1, further comprising:

at least one mainframe component including said container connected thereto;

at least one workstation component spaced from said mainframe component and connected in selective fluid communication through a distribution conduit to said container of said at least one mainframe component.

34. An apparatus as recited in claim 33, wherein said at least one workstation component includes a pulverulent material inlet connected to said distribution conduit, and includes a pulverulent material outlet connected through an outlet conduit to a tire valve stem of said at least one tire.

35. An apparatus as recited in claim 34, wherein said outlet conduit of said at least one workstation component is connected to said tire valve stem through an air chuck.

36. An apparatus as recited in claim 34, wherein said workstation component further comprises a compressed air inlet for connection to a source of compressed air wherein said compressed air inlet is in selective fluid communication with said outlet conduit of said workstation component such that compressed air is selectively communicated into said tire.

37. An apparatus as recited in claim 36, wherein said workstation component further comprises an air pressure sensor connected in fluid communication with said tire valve stem.

38. An apparatus as recited in claim 37, further comprising:
   at least one microcontroller; and,
   a solenoid valve connected between said compressed air inlet and said outlet conduit of said at least one workstation component,
   wherein said air pressure sensor and said solenoid valve are connected to said at least one microcontroller such that said microcontroller opens and closes said solenoid valve in response to the air pressure sensed within said at least one tire.

39. An apparatus as recited in claim 34, wherein said workstation component further comprises an exhaust outlet in selective fluid communication with said outlet conduit of said workstation such that compressed air is selectively exhaustible from said at least one tire.

40. An apparatus as recited in claim 39, further comprising a microcontroller and a solenoid valve provided between said outlet conduit and said exhaust outlet of said workstation component, wherein said solenoid valve is connected to said at least one microcontroller and is opened and closed in response to electrical signals received from said microcontroller to thereby provide selective fluid communication of compressed air from within said at least one tire to said exhaust outlet.

41. An apparatus as recited in claim 34, wherein said workstation component comprises a runout sensor for sensing at least the radial runout of said at least one tire.

42. An apparatus as recited in claim 41, wherein said runout sensor senses the lateral runout of said at least one tire.

43. An apparatus as recited in claim 1, wherein said means for measuring a predetermined amount of said pulverulent is a weight scale.

44. A method of introducing a pulverulent material into a tire, said method comprising the steps of:
   providing a container having an inlet in selective fluid communication with a source of pulverulent material and having an outlet in selective fluid communication with a tire;
   measuring a pre-determined amount of said pulverulent material within said container;
   dispensing pulverulent material into said container by establishing an air-pressure differential between said source of pulverulent material and said container;
   exhausting pulverulent material from said container by pressurizing said container.

45. A method as recited in claim 44, wherein said dispensing step is carried out by selectively connecting said container to a vacuum source such that a low-pressure condition, relative to ambient pressure, is established within said container such that pulverulent material is suctioned from said source into said container.

46. A method as recited in claim 45, wherein said vacuum source is provided by a venturi having an inlet in fluid communication with a source of compressed air, an outlet, and an vacuum port in fluid communication with said container.

47. A method as recited in claim 46, wherein said container includes a pressure-variation orifice, and wherein said vacuum port of said venturi is connected to said pressure-variation orifice.

48. A method as recited in claim 44, wherein said step of exhausting pulverulent material from said container is carried out by selectively connecting said container to a source of compressed air such that a high-pressure condition, relative to the air pressure within said tire, is established within said container.

49. A method as recited in claim 48, wherein said container includes a pressure variation orifice, and wherein said source of compressed air is connected to said pressure variation orifice.

50. A method as recited in claim 44, wherein said step of providing a container is carried out by providing a cylinder having a pulverulent material inlet, a pulverulent outlet, and a pressure variation orifice formed therein.

51. A method as recited in claim 44, wherein said step of dispensing pulverulent material into said container comprises the steps of:
   monitoring the weight of pulverulent material dispensed into said container;
   terminating the flow of pulverulent material into said container upon the existence of a predetermined weight of pulverulent material therein.

52. A method as recited in claim 49, wherein said step of exhausting pulverulent material from said container comprises the steps of:
   monitoring the amount of pulverulent material remaining within said container by monitoring the weight of pulverulent material within said container; and,
   terminating said step of pressurizing said container when said container is at least substantially empty of pulverulent material.

53. A method as recited in claim 52, wherein said step of monitoring the weight of pulverulent material dispensed into said container and said step of monitoring the amount of pulverulent material remaining within said container are carried out by supporting said container on a weigh scale.

54. A method as recited in claim 53, wherein said weigh scale is a load cell.

55. A method as recited in claim 54, wherein said step of terminating the step of pressurizing said container when said container is at least substantially empty of pulverulent material is carried out by:
   providing a microcontroller; and,
   connecting said load cell to said microcontroller such that said microcontroller receives data regarding the weight of pulverulent material within said container and such that said microcontroller terminates the pressurization of said container when said pulverulent has been exhausted therefrom.

56. A method as recited in claim 51, wherein said step of monitoring the weight of pulverulent material dispensed into said container is carried out by supporting said container on a weigh scale.

57. A method as recited in claim 56, wherein said weigh scale is load cell.

58. A method as recited in claim 57, wherein said step of terminating the flow of pulverulent material into said container is carried out by:
   providing a microcontroller; and,
   connecting said load cell to said microcontroller such that said microcontroller receives data regarding the weight of pulverulent material within said container and such that said microcontroller terminates said air pressure differential upon the occurrence of a predetermined weight of pulverulent material within said container.

59. An apparatus for introducing pulverulent material into a tire, said apparatus comprising:
   a container for receiving and confining an amount of pulverulent material, said container including a pulverulent material inlet in selective fluid communication with a source of pulverulent material, a pulverulent material outlet in selective communication with at least one tire, and at least one pressure variation orifice;

a means for measuring a pre-determined amount of said pulverulent material within said container;

whereby pulverulent material is pneumatically dispensed into said container from said source of pulverulent material up to said pre-determined amount and subsequently pneumatically expelled therefrom and introduced into said at least one tire.

60. A method of introducing a pulverulent material into a tire, said method comprising the steps of:

providing a container having an inlet in selective fluid communication with a source of pulverulent material and having an outlet in selective fluid communication with a tire;

introducing an amount of pulverulent material into said container;

measuring a pre-determined amount of said pulverulent material;

substantially suspending said pre-determined amount of pulverulent material within a volume of fluid;

dispensing pulverulent material into said container by establishing an air pressure differential between said source of pulverulent material and said container;

pneumatically exhausting pulverulent material from said container.

* * * * *